United States Patent
Schulmeister et al.

(10) Patent No.: US 9,774,763 B2
(45) Date of Patent: Sep. 26, 2017

(54) METHOD FOR CONTROLLING A PRINTING PROCESS

(75) Inventors: Peter Schulmeister, Pfaffenhofen (DE); Florian Fejfar, Munich (DE); Andreas Elchlepp, Aichach (DE)

(73) Assignee: manroland web systems GmbH, Augsburg (DE)

( * ) Notice: Subject to any disclaimer, the term of this patent is extended or adjusted under 35 U.S.C. 154(b) by 0 days.

(21) Appl. No.: 13/508,945

(22) PCT Filed: Oct. 30, 2010

(86) PCT No.: PCT/EP2010/006642
§ 371 (c)(1),
(2), (4) Date: Aug. 3, 2012

(87) PCT Pub. No.: WO2011/057725
PCT Pub. Date: May 19, 2011

(65) Prior Publication Data
US 2012/0285343 A1    Nov. 15, 2012

(30) Foreign Application Priority Data

Nov. 10, 2009 (DE) .................. 10 2009 046 594

(51) Int. Cl.
*B41F 33/16* (2006.01)
*H04N 1/60* (2006.01)
*B41F 33/00* (2006.01)

(52) U.S. Cl.
CPC ....... *H04N 1/6033* (2013.01); *B41F 33/0009* (2013.01); *B41F 33/0036* (2013.01); *B41F 33/16* (2013.01)

(58) Field of Classification Search
CPC .. B41F 33/0009; B41F 33/0036; B41F 33/16; B41P 2233/00
USPC ............................................ 101/484; 400/62
See application file for complete search history.

(56) References Cited

U.S. PATENT DOCUMENTS

| | | | |
|---|---|---|---|
| 6,791,711 | B1 | 9/2004 | Uekusa et al. |
| 2003/0053134 | A1 | 3/2003 | Haro |
| 2006/0280537 | A1 | 12/2006 | Matsushima |
| 2007/0079717 | A1 | 4/2007 | De Vries et al. |

FOREIGN PATENT DOCUMENTS

| | | |
|---|---|---|
| DE | 10 2004 021 601 A1 | 12/2005 |
| EP | 1 184 176 A2 | 3/2002 |
| EP | 1 401 192 A2 | 3/2004 |
| JP | 2000-13622 A | 1/2000 |
| JP | 2003-103885 A | 4/2003 |
| JP | 2006-30422 A | 2/2006 |
| JP | 2006-345356 A | 12/2006 |

OTHER PUBLICATIONS

PCT/EP2010/006642 PCT/ISA/210, dated Mar. 24, 2011, 3 pages.
German-language Japanese Office Action issued in Japanese counterpart application No. 2012-538222 dated Feb. 12, 2016 (Six (6) pages).

*Primary Examiner* — Leslie J Evanisko
(74) *Attorney, Agent, or Firm* — Crowell & Moring LLP

(57) ABSTRACT

A method for controlling a printing process is disclosed. The method includes printing a printing material by a printing unit on a basis of data of a prepress stage. A printed result on the printing material is compared with a desired value and a correction value is derived from the comparison. The data of the prepress stage is corrected with the correction value.

9 Claims, 3 Drawing Sheets

METHOD FOR CONTROLLING A PRINTING PROCESS

This application claims the priority of International Application No. PCT/EP2010/006642, filed Oct. 30, 2010, and German Patent Document No. 10 2009 046 594.4, filed Nov. 10, 2009, the disclosures of which are expressly incorporated by reference herein.

BACKGROUND AND SUMMARY OF THE INVENTION

The invention relates to a method for control a printing process, in particular with digital printing units.

Preparing necessary information, i.e., so-called printing data, that is already suited for the predetermined mechanical printing conditions and the predetermined printing method and correspondingly establishing the area coverages and colors in a digital database during a prepress stage, i.e., during a production stage upstream from the actual mechanical printing process, is generally known. The printing process is then carried out based on these data in a printing press such as, for example, an ink jet printing unit or a laser printing unit, and these digital printing data are no longer modified during printing production. In the case of offset printing methods or other printing methods with physically fixed printing forms, printing plates or other printing forms are fabricated based on these data, which are then used to generate several thousand printed copies for example. In multicolor printing that is typically used nowadays, color image data designed and prepared during the creative prepress stage are broken down into color separations. These separations are then printed during the printing process with the printing inks available in the case of the relevant printing method. The color impression of the different color tones contained in the color image data is produced when the color separations are printed together in the available printing inks. The color separations contain for every pixel the relative coverages of the respectively used printing inks, as a rule cyan, magenta, yellow and black (CMYK). Breaking down the color image data of the job usage data into the individual color separations normally takes place using the so-called RIP process. RIP is the common abbreviation for "raster image processor". In this process, the page objects (images, text, graphic elements, etc.) contained in the job usage file are converted into the pixel-oriented image suitable for the relevant digital printing method. In doing so, the breakdown into the individual color separations for the printing inks used in the printing method is carried out, wherein a one-color color separation file is generated for each color separation of one of these printing inks in the pixel-oriented image data format suitable for the printing method (e.g., Tiff, wherein TIFF is the abbreviation for "tagged image file format", a halftone image file format).

Furthermore, systems are known which ascertain the color reproduction in the printing process using corresponding measuring techniques (inline, online, offline) and control or regulate using automatic or manual feedback. However, in the process only printing-process-specific parameters for the printing press are controlled or regulated, and the digital printing data established during the prepress stage remain unchanged.

In electrographics, for example the charging potential of the photoconductor, the depth of discharge from the exposure unit, the direct-current potential in a developer system or the toner concentration may be adjusted as printing-process-specific parameters, in order to influence the printed result or the print quality.

In the case of inkjet printing units, the drop size among other things may be modulated as printing-process-specific parameters.

It turns out in practice according to the prior art that the possibilities of influencing the print quality, especially the color reproduction solely by changing the printing-process-specific parameters on the printing press are very limited.

For example, many of the common control and regulation parameters for influencing color reproduction are not locally controlled, but have an effect on the entire printed area. Therefore, it is not possible to influence individual elements in the subject in terms of color with the available technology.

In the case of inkjet printing units, the possibilities for control and regulation according to the prior art are basically restricted, because the adjustable drop volumes are normally inherent in the system, even though some manufacturers offer a certain number of different drop sizes. A finely graduated control can only be realized with difficulty or not at all with the technologies available in this environment. In addition, the color reproduction cannot be influenced selectively by color with the known technology.

The object of the invention is creating an improved method for controlling a printing process.

The core of the method according to the invention must be seen as effecting control or exerting influence by correcting or changing the digital data that are generated during the prepress stage instead of the approach that is common nowadays, i.e., influencing print quality using the available control and regulations parameters of the printing unit.

In this case, measured values, particularly spectral values, on the printed product describing the actual result of the print run in terms of color are ascertained and compared with predetermined desired values. Corresponding color corrections are derived from the deviations between the actual and desired values that are yielded. Using the calculated correction, the printing data from the prepress stage are modified. A dedicated color calculator may be used for this. In the same way, already existing hardware and software may be used for this correction.

The control method according to the invention may be advantageously integrated in the entire printing process in different variants.

Thus, for example the color calculator can be integrated into the printing press. It is also advantageously possible to carry out the correction of the printing data outside of the printing press during the data preparation upstream from the printing. The correction may also be carried out on the basis of individually printed pages or individual page objects or on the basis of an imposed digital printing form.

Ascertaining the measured data may be carried out in this case either inline (i.e., measuring in the printing unit during the ongoing printing process) or online (i.e., the measuring device is connected in terms of its data with the control and regulation system, however, the freshly printed print product is removed from the ongoing printing process for the measuring process and measured outside the printing press).

Camera-based measuring system among others may be used for the measurement. Predetermined measuring elements, e.g., predefined measuring fields of an integrated print control strip, may be measured among other things. In the same way, specified regions of the printed area or else the entire printed area may also be ascertained. This type of measurement in non-predetermined measuring fields but in any desired regions of the printed product is also referred to as "measurement in the image". In the case of the last-mentioned embodiment, there is the advantageous possibility of concentrating especially on the colors in the printed product that are critical for the job and to reproduce these with the best possible approximation via a suitable correction of the job usage data.

The method according to the invention makes a much more precise adjustment of the color reproduction of the printing data and is especially advantageous for an individual treatment of the individual regions of the printed area.

At the same time, it is possible with the method according to the invention to considerably reduce the control intervals in an advantageous manner and carry out an adjustment of the color reproduction almost in real time. In addition, the method according to the invention advantageously makes the selective adjustment of individual color regions possible.

The group of printing methods in which the printed image is transmitted directly from a computer to a printing press/printing unit without a static printing form being used should be understood as digital printing with respect to the invention. These are preferably inkjet printing units or electro-photographic printing systems such as a laser printer, which are preferably designed for high print run numbers. Of course, other digital printing units may also be provided.

Advantageous embodiments and expedient further developments of the higher-level measures are disclosed in the dependent claims and are given in greater detail in the following description of the example based on the schematic drawing.

The drawings described below show the following.

DETAILED DESCRIPTION OF THE DRAWINGS

Figure 1:
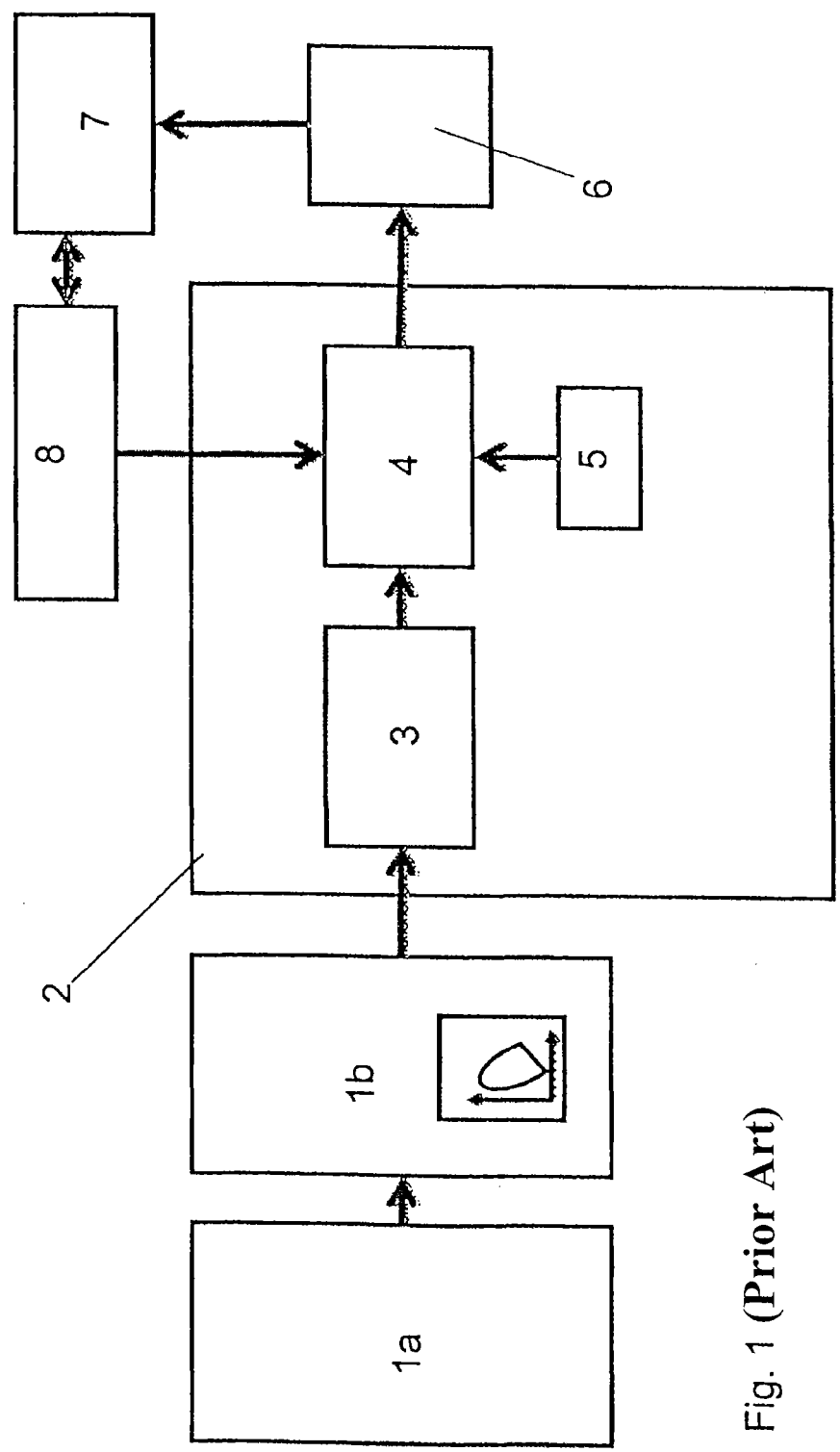
FIG. 1 is a workflow of a digital printing press according to the prior art.

FIG. 1 depicts a workflow of a digital printing press according to the prior art, which begins with a prepress stage 1a, during which the design of a printed product is established, i.e., the arrangement of content such as text or graphic images as well as the color design. This creative portion of the prepress stage 1a is independent of which printing unit is supposed to be used to produce the printed product.

In a further step 1b during the prepress stage, data are then ascertained as a function of the printing methods and depending upon what type of printing unit is supposed to be used to produce the printed product. The data are used to control the printing unit in such a way that in particular the desired color reproduction, i.e., the one specified during the prepress stage 1a, is achieved on the printed product.

The so-called color separations 3 are also a part of this and they constitute a separation of a color original into the four printing process colors of cyan, magenta, yellow and black (CMYK) for example and establishing which locations of the subject are to be printed with which portion of the printing process inks.

The density and ink settings 4 are made on the printing unit 2 based on the color separations 3 supplied from the prepress stage 1b. Printed products 6 are printed based on these settings and measured/checked manually or mechanically with respect to color reproduction in or with corresponding measuring devices 7 in order to determine the actual color values. If deviations in the color reproduction from the predetermined target color values are established based on disturbances 5, the operator is able to counteract this deviation with a corrective intervention 8 on the printing unit 2.

However, in this case merely printing-process-specific parameters on the printing unit 2 such as, for example, the drop size for inkjet printing units, may be changed. In electrographics, for example the charging potential of the photoconductor, the depth of discharge from the exposure unit, the direct-current potential in a developer system or the toner concentration may be adjusted in order to influence the printed result or the print quality. However, the control and regulation parameters on a printing unit 2 that are normally adjustable to influence color reproduction are not locally controlled, but have an effect on the entire printed surface. Therefore, it is not possible to influence individual elements in the subject in terms of color with these adjustment possibilities.

Figure 2:
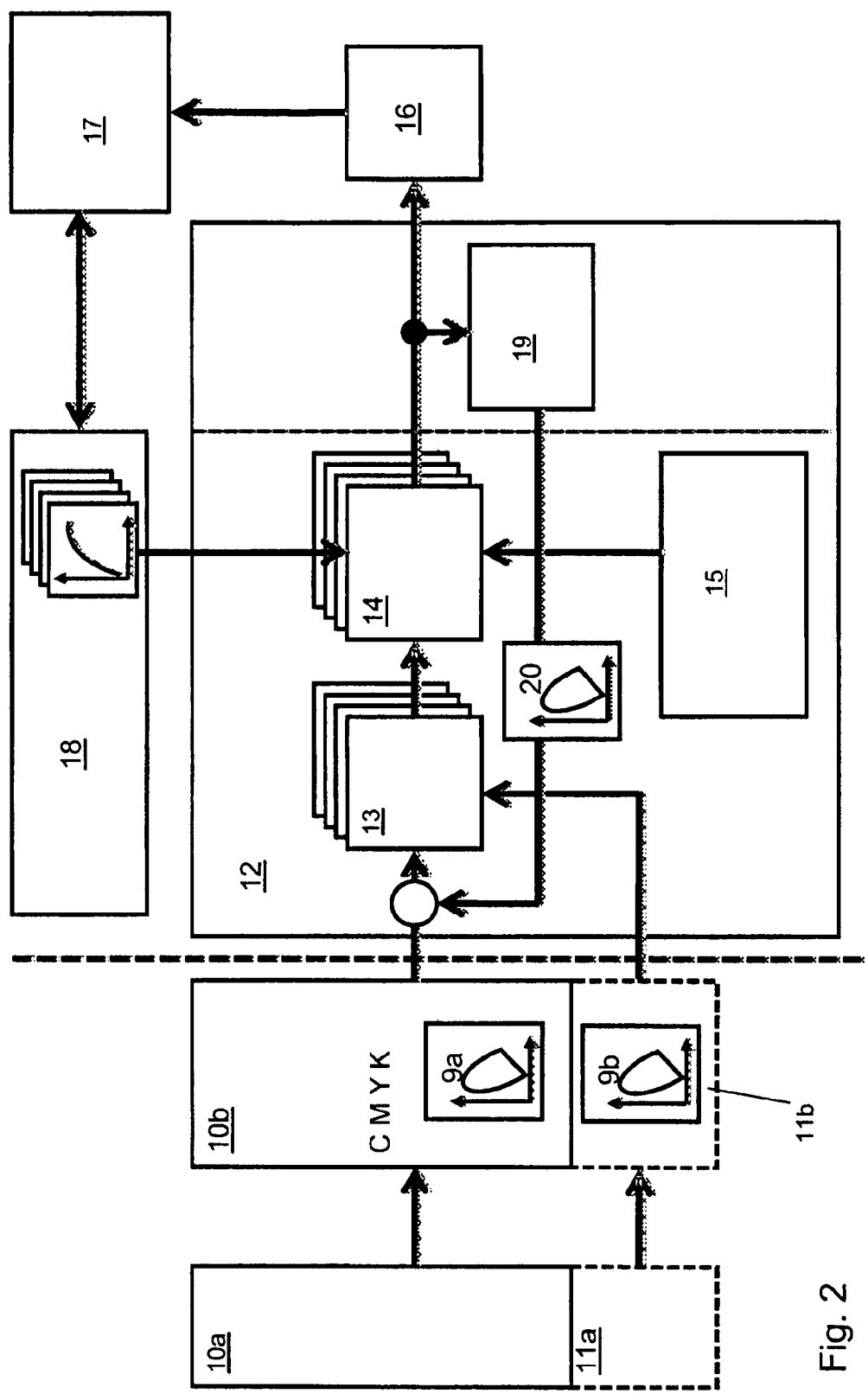
FIG. 2 is a workflow according to the invention of a digital printing press.

FIG. 2 depicts the sequence according to the invention. Just as in the prior art according to FIG. 1, the design of a printed product 16 is also established during a prepress stage 10a. In a further step 11a, variable data/printed content may also be provided. In this case, this is content, which is replaced by other content after a certain number of printed copies, while another portion of the printed content remains unchanged or static. Variable content may be address data, for example, which must be replaced with a different data for each printed copy.

Both the static data as well as the variable data are converted during a next step 10b or 11b via a so-called ICC reference profile 9a or 9b and an ICC target profile 20 into printing data that may be used to control a printing unit 12. An ICC profile, which is a synonym for color profile, is a standardized data record, which describes the color characteristics of a color input or color reproduction device, e.g., monitor, printer, scanner, etc. This data record may be used to determine the control data for a printing unit among other things, which data are the basis for realizing a predetermined color representation on a printed product. The so-called color separations 13 are also a part of this and they constitute a separation of a color original into the four printing process colors of cyan, magenta, yellow and black (CMYK) and establishing which locations of the subject are to be printed with which portion of the printing process inks.

The density and ink settings 14 are made on the printing unit 12 based on the color separations 13 supplied from the prepress stage 10b and 11b. Printed products 16 are printed based on these settings and measured with respect to color reproduction with a sensor system 19, i.e., the actual color values are determined, and compared with corresponding target color values from the prepress stage 10a and 11a. The sensor system 19 is preferably integrated into the printing unit 12, but it may also be positioned downstream.

If the color reproduction deviates from a desired value because of disturbances 15, the data adopted from the prepress stage 10b, 11b according to this embodiment of the invention are corrected within the printing unit 12 and new adjusted color separations 13 are calculated as the result of the correction. The measured values obtained are used to generate a new ICC profile 20 (target profile), which describes the momentary color reproduction characteristics for printing.

The use of the predetermined reference profile 9a/9b and the newly generated target profile 20 allows a closed color management path made up of the reference profile 9a/9b and the target profile 20 to be established. As a result, it is possible to adapt the job usage data (color image data) to the given printing conditions. Color management may be used to coordinate different input and output device such as scanners, digital cameras, monitors, printers as well as film and plate exposure systems with one another.

The sensor system 19 ascertains the printed results preferably inline, i.e., during the printing process, and automatically corrects the data without manual intervention by an operator.

Independent of this, the operator is also able to measure/check the printed products manually or mechanically in or with corresponding measuring devices 17 and counteract any deviations in the color reproduction with a corrective intervention 18 on the density/color setting device 14 of the printing unit 12.

Figure 3:
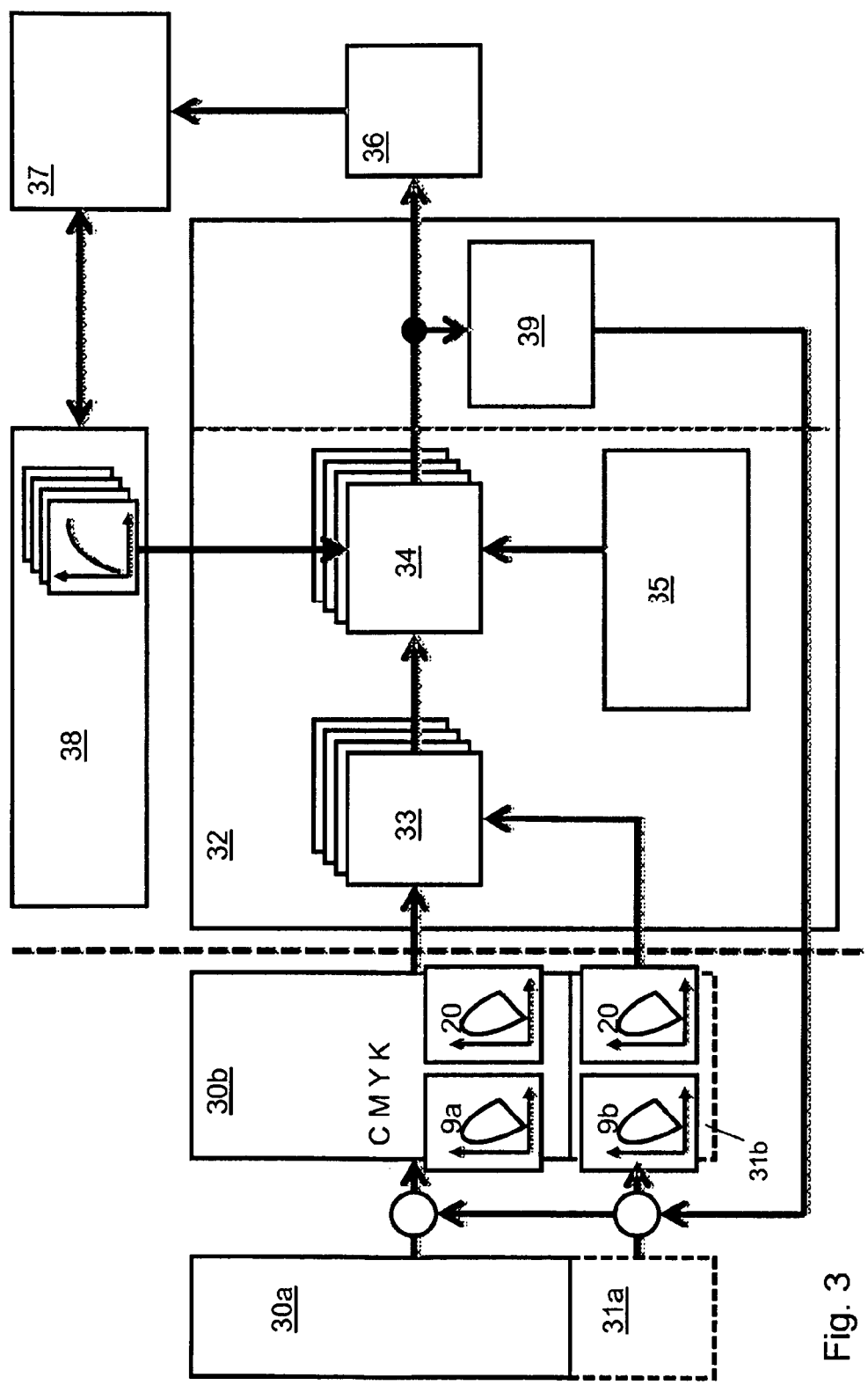
FIG. 3 is another workflow according to the invention of a digital printing press.

The exemplary embodiment according to FIG. 3 differs from the one in FIG. 2 in that the deviations in the color reproduction caused by disturbances 35 are processed directly during the prepress stage 30b, 31b and are taken into consideration there when determining printing-unit-specific printing data, in particular when creating the color separations 33. This may and should take place preferably continuously during the print production run. In the process, the data are preferably corrected in real time and the newly calculated color separations are used for ongoing printing production. In an especially advantageous embodiment of the method, this correction of the data and the use of the newly calculated color separations for the ongoing printing production may be carried out in real time, i.e., immediately.

In this case, according to this exemplary embodiment, the printing-unit-specific data for the variable printed content are also preferably corrected.

Still other advantageous embodiments of the invention according to FIG. 2 or 3 are cited in the following.

The correction according to the invention of the corresponding prepress stage data/image data may be carried out on the basis of measured values obtained from inside or outside of the printing unit. It is also possible to carry out the correction of the image data inside or outside of the printing unit.

The correction may be carried out on the basis of color management. In this case, a new ICC profile may be calculated or an existing ICC profile may be modified from the measured values obtained. The color management path for correcting the image data is normally made up of a source and a target profile. The source profile may be viewed as the target specification for the color appearance of the area coverage values contained in the job usage data when printed together. The target profile describes the current printing conditions of the respective printing method in question. If the mentioned correction according to the invention is carried out on the basis of color management, then the target profile is preferably recreated or modified.

When carrying out the method according to the invention, the measured color values may advantageously also be recorded in predetermined control fields printed on the printed product or directly in the printed image.

In doing so, it is advantageous with respect to the measured values to also collect the respective associated information about the location of the measurement and to supply it if necessary and use it for comparing actual and desired values.

The evaluation or measurement of the printed results may be carried out by an optical measuring system, e.g., a camera-based system.

The ascertained measured values may be converted into colormetric values. In doing so, known technologies such as, for example, look-up tables or else mathematical methods such as a vector-based color space transformation may be used.

The target color values that are relevant for controlling the printing process are preferably derived from a calibration color profile of the printing unit that was prepared in advance.

The target color values may also be determined or derived from measuring a supplied reference printed copy, for example a test print. It is likewise possible for the target values to be such color values that are derived from a standard for a printing method, for example the valid ISO standard for offset printing.

The target values which describe the colors and are relevant for control may originate from the prepress stage.

Using the method according to the invention, carrying out the color control on an individual basis for individual pages or even individual page objects of the printed product or even groupings thereof is possible in an especially advantageous manner.

In the case of the method according to the invention, it is also advantageously possible to modify at least some of the target/desired color values relevant for the control via manual intervention. This correction may be carried out by visual inspection for example. This type of manual correction may be necessary for example despite predetermined desired values, because a customer may want to have individual requests taken into consideration during the print run.

For the purposes of visual inspection, it is advantageous to use a calibrated and, if applicable, profiled so-called soft-proof monitor that is known to a person skilled in the art which makes a color-consistent representation possible on the basis of existing target color values. In addition, it is advantageous in this connection to display at least some of the target values in a locally-controlled manner.

The predetermined corrections according to the invention are preferably applied to the color profiles used, wherein either existing profiles are modified or other profiles may be selected.

The interventions according to the invention in the control or corrections to the control may be logged advantageously over the time period and this information is utilized for an optimization of the control process.

The method according to the invention may be used for static and variable printing data content. In doing so, static and variable content regarding the control may be handled the same way or differently. Therefore, it is possible to control static and variable content individually, if need be via separate control loops. The correction according to the invention may be carried out before, during or after the separation of the image data. It may affect one or more color separations.

It is advantageous to carry out the control according to the invention by a modification of the mapping of the tonal values to existing, available halftone dot arrangements and associated area coverages in print.

The halftone dot arrangements may be periodic, non-periodic or a combination of periodic and non-periodic rasters. The correction may be carried out during the calculation of the data on the RIP system. For this purpose, the input parameters of the RIP process, for example an ICC target profile to be used, may be correspondingly modified. The raster image processor (RIP) translates the values of a file into the language that a printing unit can understand and thereby controls the production of every individual halftone dot.

The data correction may likewise be carried out prior to the RIP process on the basis of the page descriptions, for example on a PDF basis.

The method according to the invention controls the coloration in particular during printing production. In order to be able to carry out the correction according to the invention in real time, it may be meaningful or even necessary to use a dedicated color calculator. If real time or nearly real time control is not required, then it is possible with correspondingly longer control times to also fall back on already existing hardware in order to carry out the correction according to the invention.

LIST OF REFERENCE NUMBERS

1*a* Prepress stage (creative portion)
1*b* Prepress stage
2 Printing unit
3 Color separations
4 Density/ink setting
5 Disturbances
6 Printed product
7 Measuring device
8 Corrective intervention
9*a* Reference profile (source profile) for static data
9*b* Reference profile (source profile) for variable data
10*a* Prepress stage (creative portion, static data)
10*b* Prepress stage (static data)
11*a* Prepress stage (creative portion, variable data)
11*b* Prepress stage (variable data)
12 Printing unit
13 Color separations
14 Density/ink setting
15 Disturbances
16 Printed product
17 Measuring device
18 Corrective intervention
19 Sensor system
20 ICC profile (target profile)
30*a* Prepress stage (creative portion, static data)
30*b* Prepress stage (static data)
31*a* Prepress stage (creative portion, variable data)
31*b* Prepress stage (variable data)
32 Printing unit
33 Color separations
34 Density/ink setting
35 Disturbances
36 Printed product
37 Measuring device
38 Corrective intervention
39 Sensor system

The invention claimed is:

1. A method for controlling a printing process, comprising the steps of:
generating printing data by a prepress processor, wherein the printing data includes color separation data;
communicating the printing data to a printing unit downstream of the prepress processor, wherein the printing unit is separate from the prepress processor;
printing a printing material by the printing unit based on the printing data generated by the prepress processor upstream of the printing unit, wherein the printing unit is a digital printing press;
comparing a printed result on the printing material inline, by a sensor system of the printing unit during the printing, with a desired value;
deriving a correction value from comparing the printed result with the desired value; and
correcting the printing data based on the correction value, wherein correcting the printing data includes calculating adjusted color separation data, and wherein correcting the printing data occurs within the printing unit subsequent to the printing unit receiving the print data from the prepress processor, and wherein correcting the printing data is performed by the sensor system.

2. The method according to claim 1, wherein the printing data includes a predetermined reference profile.

3. The method according to claim 1, wherein the printed result is a printed color value and the desired value is a target color value.

4. The method according to claim 1, wherein the printing material is an individual page or an individual page object.

5. The method according to claim 1, further comprising the steps of logging an intervention over time and optimizing the printing process based on the logging.

6. The method according to claim 1, wherein the printing data includes a mapping of tonal values to halftone dot arrangements.

7. The method according to claim 1, wherein correcting the print data is further performed on a basis of a page description or on a raster image processor (RIP) layer.

8. The method according to claim 7, wherein the page description is a portable document format (PDF).

9. The method according to claim 1, wherein correcting the print data further utilizes a dedicated color calculator.

* * * * *